Patented Aug. 6, 1935

2,010,613

UNITED STATES PATENT OFFICE 2,010,613

CHROMIFEROUS DYESTUFFS AND PROCESS OF MAKING SAME

Fritz Straub, Basel, and Hermann Schneider, Riehen, near Basel, Switzerland, assignors to Society of Chemical Industry in Basle, Basel, Switzerland No Drawing. Application July 3, 1933, Serial No. 678,988. In Switzerland July 19, 1932

22 Claims. (Cl. 260—12)

The present invention relates to chromiferous dyestuffs. It comprises the process of making same, as well as the new dyestuffs themselves.

It has been found that chromiferous dyestuffs from preformed and separated chromium compounds of ortho-hydroxyazo-dyestuffs which chromium compounds contain less chromimum than corresponds with one atom of chromium for each group which is capable of being chromed in the dyestuff molecule, and which ortho-hydroxyazo-dyestuffs correspond to the general formula

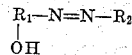

wherein $R_1$ means a sulfonated naphthalene radical and $R_2$ a naphthol radical, and wherein the hydroxyl group of the radical $R_1$ stands in ortho-position to the azo-bridge, may be produced by boiling for at least one hour these chromium compounds with alkaline agents.

Ortho-hydroxyazo-dyestuffs of the above general formula may be obtained from different diazotized ortho - hydroxyaminonaphthalene - sulfonic acids by coupling them with different naphthols. Diazo-compounds of suitable ortho-hydroxyaminonaphthalene-sulfonic acids are for example the diazo compounds of 1-amino-2-hydroxynaphthalene-4-sulfonic acid, 1-hydroxy-2-aminonaphthalene-4-sulfonic acid, 1-amino-2-hydroxynaphthalene-6-sulfonic acid, 1-amino-2-hydroxynaphthalene-4,8-disulfonic acid, 1-amino-2-hydroxynaphthalene-4,6-disulfonic acid, 1-amino-2-hydroxynaphthalene-6-chloro-4-sulfonic acid, 1-amino-2-hydroxynaphthalene-6-bromo-4-sulfonic acid; further there may also be used as diazo components for example the nitrated 1-diazo-2-hydroxynaphthalene-4-sulfuric acid and the nitrated 1-diazo-2-hydroxynaphthalene-6-sulfonic acid.

Suitable coupling components are $\alpha$- and $\beta$-naphthol and the substitution products thereof, for example 8-chloro-$\alpha$-naphthol and 5,8-dichloro-$\alpha$-naphthol, 1-hydroxynaphthalene-5-sulfonic acid and 2-hydroxynaphthalene-6-sulfonic acid.

From these ortho-hydroxyazo-dyestuffs the chromium compounds which are to serve as parent materials for the invention and contain for each group capable of being chromed in the dyestuff molecule less than one atom of chromium, are made by chroming the dyestuff with different chroming agents, there being used for the chroming either a proportion of the chroming agent corresponding with less than 1 atom of chromium for each group capable of being chromed in the dyestuff molecule, or a larger proportion than this, in which latter case the chroming conditions in respect of time, temperature and hydrogen-ion concentration must be milder than when the proportion is smaller in order that the amount of chromium entering the dyestuff molecule may be less than 1 atom of chromium for each group capable of being chromed.

The treatment with an alkaline agent, which term includes an alkaline chroming agent (alkali metal chromite), for instance with caustic soda solution, caustic potash lye, ammonia, sodium carbonate, tertiary alkali phosphate or borax, may be performed in an open vessel or under pressure in presence or absence of additions, such as an inorganic or organic alkali salt.

The chromiferous dyestuffs obtainable according to the present process dye blue to black tints, the dyestuffs dyeing marine blue tints are particularly valuable, and the mode of dyeing is advantageously that described in Patent No. 1,903,884, or by dyeing from a bath containing aromatic acids and sulfuric acid. Unlike the hitherto known dyestuffs of this group, which dye animal fiber in similar tints, they also dye deep tints which are level and in all respects fast, particularly to rubbing. The invention provides a method for converting the very cheap blue dyeing dyestuffs, known as chrome fast cyanines, into chromium compounds which are cheap and dye fast marine blue tints, which was not possible by the chroming methods hitherto known.

The following examples illustrate the invention, the parts being by weight:—

*Example 1*

41.6 parts of the azo-dyestuff of the formula

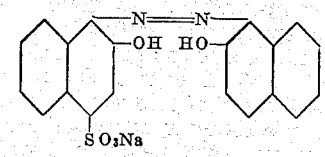

from diazotized 1-amino-2-hydroxynaphthalene-4-sulfonic acid and $\beta$-naphthol (sodium salt) are dissolved in 800 parts of water with addition of 13 parts of caustic soda solution of 30 per cent. strength and 10 parts of sugar; the solution is mixed with one of 7.8 parts of $Cr_2O_3$, 14 parts of formic acid of 85 per cent. strength and 3.1 parts of crystallized oxalic acid, and the whole is boiled in a reflux apparatus until the parent dyestuff has disappeared, which can be ascertained by taking a sample of the mixture, making this sample alkaline with sodium carbonate, feebly heating it and pouring it upon filter-paper and testing the paper with dilute mineral acid to see whether there is any change of color; if there is no change the whole is salted out and filtered. The dyestuff paste thus obtained is added to a solution of 80 parts of caustic soda solution of 30 per cent. strength in 300 parts of water and the mixture is boiled for 2 hours, then filtered, neutralized with hydrochloric acid of 10 per cent. strength and salted out. The chromium compound thus obtained is filtered and dried; it is freely soluble in water and dissolves in dilute caustic soda solution to a violet blue solution. It dyes wool in an acid bath marine blue tints of excellent fastness.

A chromium compound with, in general, like properties but of still better fastness to rubbing is obtained by varying the mode of working up by mixing the alkaline mixture with 4 parts of oxalic acid and sufficient hydrochloric acid of 10 per cent. strength to produce neutral reaction, then boiling for a short time, filtering from the chromium mud and evaporating the filtrate to dryness in a vacuum.

Example 2

41.6 parts of the azo-dyestuff from diazotized 1-amino-2-hydroxynaphthalene-4-sulfonic acid and β-naphthol are suspended in 600 parts of water, a chromium solution made from 7.9 parts of $Cr_2O_3$ and 17 parts of formic acid of 85 per cent. strength is added and the whole boiled until the parent dyestuff disappears; filtration and salting out follow. The dyestuff paste thus obtained is introduced into a solution of 90 parts of caustic soda solution of 30 per cent. strength in 300 parts of water. When dissolution has occurred, it is heated for 3 hours on the steam-bath, filtered, neutralized with hydrochloric acid of 10 per cent. strength and salted out; or, after the heating on the steam-bath, 5 parts of tartaric acid are added, the liquid is filtered, made neutral by means of hydrochloric acid of 10 per cent. strength and then evaporated to dryness in a vacuum. The dyestuff produced dissolves in dilute caustic soda solution to a violet-blue solution and dyes wool in an acid bath fast marine blue tints.

Example 3

41.6 parts of the azo-dyestuff from diazotized 1-amino-2-hydroxynaphthalene-4-sulfonic acid and β-naphthol are stirred with 800 parts of water; there is then added chromium formate corresponding with 7.8 parts of $Cr_2O_3$ and the whole is boiled in a reflux apparatus until the parent dyestuff is no longer to be detected. The chromium compound thus produced is separated in the usual manner by salting out. It is now introduced into a solution of 90 parts of caustic soda solution of 30 per cent. strength and 5 parts of sugar in 600 parts of cold water. After boiling for 3 hours in a reflux apparatus the violet blue solution thus formed is neutralized with hydrochloric acid of 10 per cent. strength, filtered from a small residue and salted out at 40–50° C. to obtain the dyestuff. This chromium compound after filtration and drying, is a violet-black powder; it dyes wool in an acid bath fast marine blue tints.

Example 4

41.6 parts of the azo-dyestuff of the formula

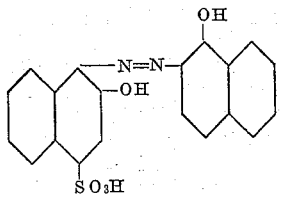

from diazotized 1-amino-2-hydroxynaphthalene-4-sulfonic acid and α-napthol are suspended in 1000 parts of water and, after addition of a chromium formate solution corresponding with 8.36 parts of $Cr_2O_3$, the whole is boiled for 2½ hours in a reflux apparatus, and the partially soluble chromium compound thus produced is salted out and filtered. The wet contents of the filter are introduced into a mixture of 70 parts of caustic soda solution of 30 per cent. strength and 600 parts of water and the mixture is stirred and boiled in a reflux apparatus for 3 hours. After cooling to 50° C. the mass is neutralized with hydrochloric acid of 10 per cent. strength, filtered if necessary, and evaporated to dryness on the water-bath.

The blue chromium compound thus obtained, which is easily soluble in water, dyes wool in an acid bath blue to marine blue tints of excellent fastness.

What we claim is:—

1. Process for the manufacture of chromiferous dyestuffs consisting in boiling for at least one hour preformed and separated chromium compounds of ortho-hydroxyazo-dyestuffs which contain less than one atom of chromium for each group capable of being chromed in the dyestuff molecule and which ortho-hydroxyazo-dyestuffs correspond to the general formula.

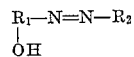

wherein $R_1$ means a sulfonated naphthalene radical and $R_2$ a naphthol radical, and wherein the hydroxyl group of the radical $R_1$ stands in ortho-position to the azo-bridge, with alkaline agents.

2. Process for the manufacture of chromiferous dyestuffs consisting in boiling for at least one hour preformed and separated chromium compounds of ortho-hydroxyazo-dyestuffs which contain less than one atom of chromium for each group capable of being chromed in the dyestuff molecule and which ortho-hydroxyazo-dyestuffs correspond to the general formula

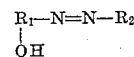

wherein $R_1$ means a sulfonated naphthalene radical and $R_2$ an unsubstituted naphthol radical, and wherein the hydroxyl group of the radical $R_1$ stands in ortho-position to the azo-bridge, with alkaline agents.

3. Process for the manufacture of chromiferous dyestuffs consisting in boiling for at least one hour preformed and separated chromium compounds of ortho-hydroxyazo-dyestuffs which contain less than one atom of chromium for each group capable of being chromed in the dyestuff molecule and which ortho-hydroxyazo-dyestuffs correspond to the general formula

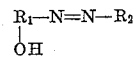

wherein $R_1$ means a monosulfonated naphthalene radical and $R_2$ an unsubstituted naphthol radical, and wherein the hydroxyl group of the radical $R_1$ stands in ortho-position to the azo-bridge, with alkaline agents.

4. Process for the manufacture of chromiferous dyestuffs consisting in boiling for at least one hour preformed and separated chromium compounds of ortho-hydroxyazo-dyestuffs which contain less than one atom of chromium for each group capable of being chromed in the dyestuff molecule and which ortho-hydroxyazo-dyestuffs correspond to the general formula

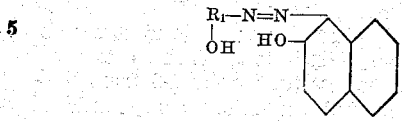

where R₁ means a monosulfonated naphthalene radical and wherein the two hydroxyl groups stand in ortho-position to the azo-bridge, with alkaline agents.

5. Process for the manufacture of chromiferous dyestuffs consisting in boiling for at least one hour preformed and separated chromium compounds of ortho-hydroxyazo-dyestuffs which contain less than one atom of chromium for each group capable of being chromed in the dyestuff molecule and which ortho-hydroxyazo-dyestuffs correspond to the general formula

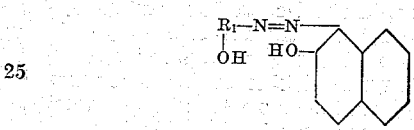

wherein R₁ means a monosulfonated naphthalene radical and wherein the two hydroxyl groups stand in ortho-position to the azo-bridge, with caustic alkalies.

6. Process for the manufacture of chromiferous dyestuffs consisting in boiling for at least one hour preformed and separated chromium compounds of ortho-hydroxyazo-dyestuffs which contain less than one atom of chromium for each group capable of being chromed in the dyestuff molecule and which ortho-hydroxyazo-dyestuffs correspond to the general formula

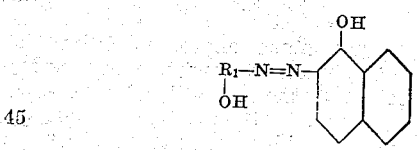

wherein R₁ means a monosulfonated naphthalene radical and wherein the two hydroxyl groups stand in ortho-position to the azo-bridge, with alkaline agents.

7. Process for the manufacture of chromiferous dyestuffs consisting in boiling for at least one hour preformed and separated chromium compounds of ortho-hydroxyazo-dyestuffs which contain less than one atom of chromium for each group capable of being chromed in the dyestuff molecule and which ortho-hydroxyazo-dyestuffs correspond to the general formula

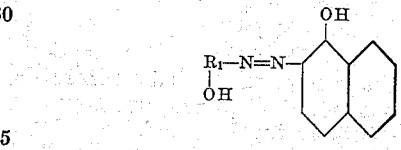

wherein R₁ means a monosulfonated naphthalene radical and wherein the two hydroxyl groups stand in ortho-position to the azo-bridge, with caustic alkalies.

8. Process for the manufacture of chromiferous dyestuffs consisting in boiling for at least one hour preformed and separated chromium compounds of ortho-hydroxyazo-dyestuffs which contain less than one atom of chromium for each group capable of being chromed in the dyestuff molecule and which ortho-hydroxyazo-dyestuffs correspond to the general formula

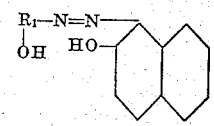

wherein R₁ means a monosulfonated naphthalene radical and wherein the two hydroxyl groups stand in ortho-position to the azo-bridge, with caustic soda solution.

9. Process for the manufacture of chromiferous dyestuffs consisting in boiling for at least one hour preformed and separated chromium compounds of ortho-hydroxyazo-dyestuffs which contain less than one atom of chromium for each group capable of being chromed in the dyestuff molecule and which ortho-hydroxyazo-dyestuffs correspond to the general formula

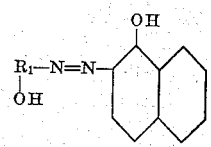

wherein R₁ means a monosulfonated naphthalene radical and wherein the two hydroxyl groups stand in ortho-position to the azo-bridge, with caustic soda solution.

10. Process for the manufacture of chromiferous dyestuffs consisting in boiling for at least one hour preformed and separated chromium compounds of the ortho-hydroxyazo-dyestuff which contain less than one atom of chromium for each group capable of being chromed in the dyestuff molecule, and which ortho-hydroxyazo-dyestuff corresponds to the formula

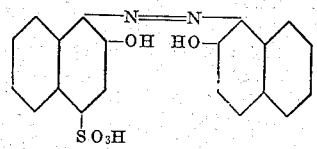

with caustic soda solution.

11. Process for the manufacture of chromiferous dyestuffs consisting in boiling for at least one hour preformed and separated chromium compounds of the ortho-hydroxyazo-dyestuff which contain less than one atom of chromium for each group capable of being chromed in the dyestuff molecule, and which ortho-hydroxyazo-dyestuff corresponds to the formula

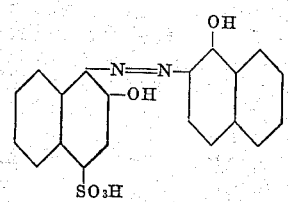

with caustic soda solution.

12. Chromiferous dyestuffs obtained from preformed and separated chromium compounds of ortho-hydroxyazo-dyestuffs which contain less than one atom of chromium for each group capable of being chromed in the dyestuff molecule, and which ortho-hydroxyazo-dyestuffs correspond to the general formula

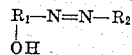

wherein R₁ means a sulfonated naphthalene radical and $R_2$ a naphthol radical, and wherein the hydroxyl group of the radical $R_1$ stands in ortho-position to the azo-bridge, by boiling for at least one hour with alkaline agents, which products represent blue to black powders which are easily soluble in water and dye wool in an acid bath very fast blue to black tints.

13. Chromiferous dyestuffs obtained from preformed and separated chromium compounds of ortho-hydroxyazo-dyestuffs which contain less than one atom of chromium for each group capable of being chromed in the dyestuff molecule, and which ortho-hydroxyazo-dyestuffs correspond to the general formula

wherein $R_1$ means a sulfonated naphthalene radical and $R_2$ an unsubstituted naphthol radical, and wherein the hydroxyl group of the radical $R_1$ stands in ortho-position to the azo-bridge, by boiling for at least one hour with alkaline agents, which products represent blue to black powders which are easily soluble in water and dye wool in an acid bath very fast blue to black tints.

14. Chromiferous dyestuffs obtained from preformed and separated chromium compounds of ortho-hydroxyazo-dyestuffs which contain less than one atom of chromium for each group capable of being chromed in the dyestuff molecule, and which ortho-hydroxyazo-dyestuffs correspond to the general formula

wherein $R_1$ means a monosulfonated naphthalene radical and $R_2$ an unsubstituted naphthol radical, and wherein the hydroxyl group of the radical $R_1$ stands in ortho-position to the azo-bridge, by boiling for at least one hour with alkaline agents, which products represent blue to black powders which are easily soluble in water and dye wool in an acid bath very fast blue to black tints.

15. Chromiferous dyestuffs obtained from preformed and separated chromium compounds of ortho-hydroxyazo-dyestuffs which contain less than one atom of chromium for each group capable of being chromed in the dyestuff molecule, and which ortho-hydroxyazo-dyestuffs correspond to the general formula

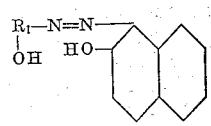

wherein $R_1$ means a monosulfonated naphthalene radical and wherein the two hydroxyl groups stand in ortho-position to the azo-bridge, by boiling for at least one hour with alkaline agents, which products represent blue to black powders which are easily soluble in water and dye wool in an acid bath very fast blue to black tints.

16. Chromiferous dyestuffs obtained from preformed and separated chromium compounds of ortho-hydroxyazo-dyestuffs which contain less than one atom of chromium for each group capable of being chromed in the dyestuff molecule, and which ortho-hydroxyazo-dyestuffs correspond to the general formula

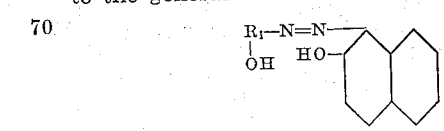

wherein $R_1$ means a monosulfonated naphthalene radical and wherein the two hydroxyl groups stand in ortho-position to the azo-bridge, by boiling for at least one hour with caustic alkalies, which products represent blue to black powders which are easily soluble in water and dye wool in an acid bath very fast blue to black tints.

17. Chromiferous dyestuffs obtained from preformed and separated chromium compounds of ortho-hydroxyazo-dyestuffs which contain less than one atom of chromium for each group capable of being chromed in the dyestuff molecule, and which ortho-hydroxyazo-dyestuffs correspond to the general formula

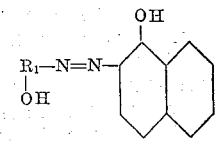

wherein $R_1$ means a monosulfonated naphthalene radical and wherein the two hydroxyl groups stand in ortho-position to the azo-bridge, by boiling for at least one hour with alkaline agents, which products represent blue to black powders which are easily soluble in water and dye wool in an acid bath very fast blue to black tints.

18. Chromiferous dyestuffs obtained from preformed and separated chromium compounds of ortho-hydroxyazo-dyestuffs which contain less than one atom of chromium for each group capable of being chromed in the dyestuff molecule, and which ortho-hydroxyazo-dyestuffs correspond to the general formula

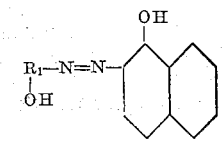

wherein $R_1$ means a monosulfonated naphthalene radical and wherein the two hydroxyl groups stand in ortho-position to the azo-bridge, by boiling for at least one hour with caustic alkalies, which products represent blue to black powders which are easily soluble in water and dye wool in an acid bath very fast blue to black tints.

19. Chromiferous dyestuffs obtained from preformed and separated chromium compounds of ortho-hydroxyazo-dyestuffs which contain less than one atom of chromium for each group capable of being chromed in the dyestuff molecule, and which ortho-hydroxyazo-dyestuffs correspond to the general formula

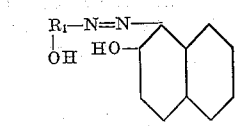

wherein $R_1$ means a monosulfonated naphthalene radical and wherein the two hydroxyl groups stand in ortho-position to the azo-bridge, by boiling for at least one hour with caustic soda solution, which products represent blue to black powders which are easily soluble in water and dye wool in an acid bath very fast blue to black tints.

20. Chromiferous dyestuffs obtained from preformed and separated chromium compounds of ortho-hydroxyazo-dyestuffs which contain less than one atom of chromium for each group capable of being chromed in the dyestuff molecule, and which ortho-hydroxyazo-dyestuffs correspond to the general formula.

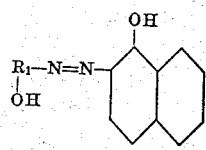

wherein $R_1$ means a monosulfonated naphthalene radical and wherein the two hydroxyl groups stand in ortho-position to the azo-bridge, by boiling for at least one hour with caustic soda solution, which products represent blue to black powders which are easily soluble in water and dye wool in an acid bath very fast blue to black tints.

21. Chromiferous dyestuffs obtained from preformed and separated chromium compounds of the ortho-hydroxyazo-dyestuff, which chromium compounds contain less than one atom of chromium for each group capable of being chromed in the dyestuff molecule, and which ortho-hydroxyazo-dyestuff corresponds to the formula

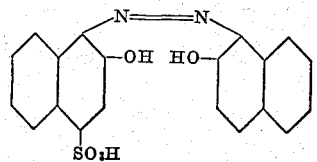

by boiling for at least one hour with caustic soda solution, which products represent blue powders which are easily soluble in water and dye wool in an acid bath very fast blue tints.

22. Chromiferous dyestuffs obtained from preformed and separated chromium compounds of the ortho-hydroxyazo-dyestuff, which chromium compounds contain less than one atom of chromium for each group capable of being chromed in the dyestuff molecule, and which ortho-hydroxyazo-dyestuff corresponds to the formula

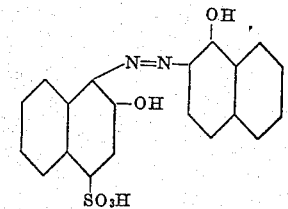

by boiling for at least one hour with caustic soda solution, which products represent blue powders which are easily soluble in water and dye wool in an acid bath very fast blue tints.

FRITZ STRAUB.
HERMANN SCHNEIDER.